(12) United States Patent
Hirata et al.

(10) Patent No.: US 8,586,675 B2
(45) Date of Patent: Nov. 19, 2013

(54) POLYOLEFIN COMPOSITIONS HAVING A LOW SEAL TEMPERATURE AND IMPROVED HOT TACK

(75) Inventors: Spencer S. Hirata, Chadds Ford, PA (US); Michele Grazzi, Casaglia (IT); Andrea Felisati, Ferrara (IT); Dean J. Spencer, Dover, DE (US); Ignazio Triassi, Wilmington, DE (US)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 13/510,794

(22) PCT Filed: Nov. 17, 2010

(86) PCT No.: PCT/EP2010/067618
§ 371 (c)(1),
(2), (4) Date: May 18, 2012

(87) PCT Pub. No.: WO2011/064124
PCT Pub. Date: Jun. 3, 2011

(65) Prior Publication Data
US 2012/0225999 A1    Sep. 6, 2012

Related U.S. Application Data

(60) Provisional application No. 61/281,947, filed on Nov. 24, 2009.

(51) Int. Cl.
*C08F 8/00* (2006.01)
*C08L 23/00* (2006.01)
*C08L 23/04* (2006.01)
*C08L 23/10* (2006.01)

(52) U.S. Cl.
USPC ............................................ 525/191; 525/240

(58) Field of Classification Search
USPC ................................................ 525/191, 240
See application file for complete search history.

(56) References Cited

U.S. PATENT DOCUMENTS

| | | | |
|---|---|---|---|
| 4,399,054 A | 8/1983 | Ferraris | |
| 4,472,524 A | 9/1984 | Albizzati | |
| 4,725,505 A | 2/1988 | Hwo et al. | |
| 4,843,129 A * | 6/1989 | Spenadel et al. | 525/240 |
| 5,780,168 A | 7/1998 | Sato et al. | |
| 7,579,407 B2 * | 8/2009 | Tau et al. | 525/191 |
| 2003/0220453 A1 | 11/2003 | Ebara | |
| 2005/0142367 A1 | 6/2005 | Su et al. | |
| 2012/0016087 A1 * | 1/2012 | Grazzi et al. | 525/240 |

FOREIGN PATENT DOCUMENTS

| | | |
|---|---|---|
| EP | 0045977 | 8/1981 |
| EP | 0679686 | 11/1995 |
| WO | WO-03031514 | 4/2003 |

* cited by examiner

*Primary Examiner* — Nathan M Nutter

(57) ABSTRACT

Polyolefin compositions comprising, all percentages being by weight:
A) from 70 to 95%, of a compositions comprising (by weight):
  $A^I$) 15-80% of one or more copolymers of propylene;
  $A^{II}$) 20-85% of one or more copolymers with different comonomer(s) content than in A)
B) from 5 to 30% of an elastomeric or plastomeric polyolefin or polyolefin composition.

22 Claims, No Drawings

POLYOLEFIN COMPOSITIONS HAVING A LOW SEAL TEMPERATURE AND IMPROVED HOT TACK

This application is the U.S. national phase of International Application PCT/EP2010/067618, filed Nov. 17, 2010, claiming the benefit under 35 U.S.C. 119(e) of U.S. Provisional Application No. 61/281,947, filed Nov. 24, 2009; the disclosures of International Application PCT/EP2010/067618 and U.S. Provisional Application No. 61/281,947, each as filed, are incorporated herein by reference.

The present invention relates to polyolefin compositions useful in the preparation of heat-sealable films, containing propylene copolymers and other polyolefin components.

Copolymers of propylene with other olefins (mainly ethylene, butene-1 or both), or mixtures of such copolymers with other olefin polymers are known in the prior art as heat-sealable materials.

These copolymers are obtained by polymerizing propylene with minor amounts of other olefin comonomers in the presence of coordination catalysts.

The polymerized comonomer units are statistically distributed in the resulting copolymer and the melting point of said copolymers results to be lower than the melting point of crystalline propylene homopolymers. Also the seal initiation temperature (as later defined in detail) of the said copolymers results to be favorably low.

However, particularly demanding applications of films, like form and fill packaging, require not only a low seal initiation temperature (hereinafter called "S.I.T."), but also a good "hot tack". As explained in U.S. Pat. No. 4,725,505, hot tack is the bonding strength measurable while the polymer in the heat sealed portion of a film is still in the semimolten/solidifying state.

Said form and fill packaging is commonly applied in the food packaging, especially for the production of bags to be used for solid and/or liquid products. The bags are produced with packaging machines that simultaneously seal the bottom seam of the bag and fills it while it is in the vertical or horizontal position. Thus the sealing, while still in the semi-molten/solidifying state, must be able to withstand the weight of the product introduced in the bag and generally also the pressure of air used to assist in transport of the product.

According to the said U.S. Pat. No. 4,725,505, the hot tack is improved by adding at least 40% by weight of a butene-1-propylene copolymer to a propylene-ethylene copolymer. The hot tack strength values so obtained, measured by carrying out the test under air pressure, are in the range of 10-15 inch of water.

According to US2005/0142367, relatively high values of hot tack strength are achieved by blending a propylene-butene-1-ethylene terpolymer with a metallocene catalyzed ethylene polymer. The terpolymer used in the examples contains relatively high amounts of comonomers, namely 1.7 mol % of ethylene and 16.2 mol % of butene-1. The hot tack strength values obtained are lower than 250 g (about 2.5 N). At 210° F. (99° C.) it is lower than 200 g.

It has now surprisingly been found that a particularly valuable balance of heat-sealability (low S.I.T.) and hot tack is obtained by blending specific propylene copolymers with a an elastomeric or plastomeric polyolefin or polyolefin composition.

Therefore the present invention provides polyolefin compositions comprising (by weight):

A) from 70 to 95%, preferably from 75 to 95%, more preferably from 78 to 95% of a compositions comprising (by weight):

$A^I$) 15-80%, preferably 20-60%, more preferably 20-50%, of one or more copolymers of propylene selected from the group consisting of ($A^I$1) propylene/ethylene copolymers containing 1-7% of ethylene; ($A^I$2) copolymers of propylene with one or more $C_4$-$C_8$ alpha-olefins, containing from 2 to less than 14% of the $C_4$-$C_8$ alpha-olefins; ($A^I$3) copolymers of propylene with ethylene and one or more $C_4$-$C_8$ alpha-olefins, containing 0.5-4.5% of ethylene and 2-6% of $C_4$-$C_8$ alpha-olefins, provided that the total content of ethylene and $C_4$-$C_8$ alpha-olefins in ($A^I$3) be equal to or lower than 6.5%;

$A^{II}$) 20-85%, preferably 40-80%, more preferably 50-80%, of one or more copolymers of propylene selected from the group consisting of ($A^{II}$1) copolymers of propylene with one or more $C_4$-$C_8$ alpha-olefins, containing from 14% to 30%, preferably from 14.5% to 25% of $C_4$-$C_8$ alpha-olefins; ($A^{II}$2) copolymers of propylene with ethylene and one or more $C_4$-$C_8$ alpha-olefins, containing 0.5-5% of ethylene and 9-30% of $C_4$-$C_8$ alpha-olefins;

B) from 5 to 30%, preferably from 5 to 25%, more preferably from 5 to 22, of an elastomeric or plastomeric polyolefin or polyolefin composition.

The said amounts of A) and B) are referred to the total weight of A)+B).

From the above definitions of propylene copolymer(s) A), it is evident that the term "copolymer" includes polymers containing more than one kind of comonomers.

The $C_4$-$C_8$ α-olefins, as well as all the α-olefins hereinafter reported as comonomers in olefin copolymers, are selected from olefins having formula $CH_2=CHR$ wherein R is an alkyl radical, linear or branched, or an aryl radical, having the appropriate number of carbon atoms; thus, for instance, from 1 to 8 carbon atoms for $C_3$-$C_{10}$ α-olefins, or from 2 to 8 carbon atoms for $C_4$-$C_{10}$ α-olefins.

Specific examples of $C_3$-$C_{10}$ α-olefins are propylene, butene-1, pentene-1,4-methylpentene-1, hexene-1 and octene-1.

Particularly preferred examples of component A) are the compositions comprising (by weight):

$A^I$) from 15% to 60%, preferably from 20% to 60%, more preferably from 20% to 50%, of a copolymer of propylene with $C_4$-$C_8$ alpha-olefin(s), preferably butene, containing more than 10%, preferably 11% or more, but less than 14%, more preferably up to 13%-13.5%, of said $C_4$-$C_8$ alpha-olefin(s);

$A^{II}$) from 40% to 85%, preferably from 40% to 80%, more preferably from 50% to 80%, of a copolymer of propylene with $C_4$-$C_8$ alpha-olefin(s), preferably butene, containing from 14% to 30%, preferably from 14.5% to 25%, more preferably from 14.5% to 22%, of said $C_4$-$C_8$ alpha-olefin(s), and optionally from 0.5% to 3% of ethylene;

provided that the total content of $C_4$-$C_8$ alpha-olefin(s) in the propylene polymer composition be higher than 10%.

Such compositions and their preparation are disclosed in WO03/031514.

The preferred comonomers in the said copolymers or of propylene are ethylene and butene-1. Preferably the MFR (Melt Flow Rate) values for propylene copolymers or propylene copolymer compositions A) range from 0.5 to 15 g/10 min., more preferably 2 to 15 g/10 min., most preferably from 2.5 to 10 g/10 min, measured at 230° C., with 2.16 kg load.

The said MFR values can be obtained directly in polymerization, or by subjecting to degradation (for instance by using organic peroxides according to known methods) a precursor polymer or polymer composition having lower MFR values.

All the said copolymers of propylene can be can be prepared by using a Ziegler-Natta catalyst in the polymerization process.

The said catalysts and the polymerization processes are known in the art.

Conventional molecular weight regulators known in the art, such as chain transfer agents (e.g. hydrogen or $ZnEt_2$), may be used.

Preferred examples of Ziegler-Natta catalysts are the supported catalyst systems comprising a trialkylaluminium compound, optionally an electron donor, and a solid catalyst component comprising a halide or halogen-alcoholate of Ti and optionally an electron-donor compound supported on anhydrous magnesium chloride. Catalysts having the above-mentioned characteristics and polymerization processes employing such catalysts are well known in the patent literature; particularly advantageous are the catalysts and polymerization processes described in U.S. Pat. No. 4,399,054 and EP-A-45 977. Other examples can be found in U.S. Pat. No. 4,472,524.

The so obtained copolymers of propylene can be blended in the molten state, with conventional apparatuses and techniques, to obtain the previously defined compositions. In alternative, the said compositions can be obtained directly in polymerization, by carrying it out in at least two sequential steps, wherein the copolymer components are prepared in separate subsequent steps, operating in each step in the presence of the polymer formed and the catalyst used in the preceding step.

The elastomeric or plastomeric polyolefin or polyolefin composition B) can be any elastomeric or plastomeric polymer or polymer composition commonly used to modify the mechanical properties of polyolefins.

The term "plastomeric" in the definition of the present invention is used to include the particular class of materials having properties intermediate to those of thermoplastic and elastomeric materials, generally called "plastomers". Said plastomers can have a broad range of densities (up to about 0.925 $g/cm^3$) and a higher crystallinity than the traditional elastomers.

Be it an elastomeric or plastomeric material, the said component B) typically has at least one of the following features:
Flexural modulus (ISO 178A) equal to or less than 200 MPa, preferably equal to or less than 170 MPa, most preferably equal to or less than 100 MPa;
Shore D hardness equal to or less than 50 points, more preferably equal to or less than 45 points and most preferably equal to or less than 32 points;
Shore A hardness equal to or less than 90 points;
X-ray crystallinity from 0 to 40%, more preferably from 0 to 30%.

Preferred examples of B) are:
1) ethylene copolymers containing up to 45% by weight, in particular from 10 to 42% by weight, of an olefin comonomer, preferably a $C_3$-$C_{10}$ α-olefin, in particular butene-1 or octene-1, and having Shore A hardness of 90 points or less.
2) propylene copolymers containing up to 40% by weight of an olefin comonomer, preferably ethylene or a $C_4$-$C_{10}$ α-olefin, and having Shore A hardness of 90 points or less.

The said ethylene copolymers 1) have typically a density from 0.86 to 0.925 $g/cm^3$.

A specific example of copolymers 1) is a copolymer containing 62 wt % of ethylene and 38 wt % of octene-1 (IR analysis), having a hardness of 21 Shore D points and 75 Shore A points, a melting point of 60° C., a MFR of 5 g/10 min. (ASTM D 1238, 190° C./2.16 kg) and a density of 0.87 g/ml according to method ASTM D 792.

It is marketed by Dow Chemical with the trademark Engage 8200.

Other polymer materials of this kind, sold by Dow under the trademark Affinity can also be conveniently used.

Another specific example of copolymers 1) is a copolymer containing 61 wt % of ethylene and 39 wt % of octene-1 (IR analysis), having a hardness of 20 Shore D points and 75 Shore A points, a melting point of 55° C., a density of 0.868 $g/cm^3$ according to method ASTM D 792 and MFR of 0.5 g/10 min (ASTM D 1238, 190° C./2.16 kg).

It is marketed by Dow Chemical with the trademark Engage 8150.

Another specific example of copolymers 1) is a copolymer of ethylene and butene-1, having a hardness of 30 Shore D points, 85 Shore A points, flexural modulus of 22.8 MPa (ASTM D 790), melting point of 60° C. and a density of 0.88 $g/cm^3$ according to method ASTM D 792. It is marketed by Exxon Chemical with the trademark Exact 4033.

Preferred examples of propylene copolymers 2) are the propylene copolymers containing from 0.1 to 40% by weight, more preferably from 0.1 to 25% by weight of olefin comonomers, in particular ethylene.

The said propylene copolymers 2) have typically a density from 0.850 to 0.890 $g/cm^3$, in particular from 0.855 to 0.885 $g/cm^3$. They generally display no or relatively low degree of crystallinity, indicatively from 0 to 25% when measured as X-ray crystallinity.

Other typical properties of propylene copolymers 2) are:
Shore A hardness equal to or less than 90 points, preferably equal to or less than 88 points, more preferably equal to or less than 75 points;
melting point, measured with differential scanning calorimetry (DSC) at a heating/cooling rate of 10-20° C., of 105° C. or less, preferably of 90° C. or less;
heat of fusion, measured with DSC under the said conditions, of 75 J/g or less;
molecular weight distribution, in terms of Mw/Mn (Mw=weight average molecular weight and Mn=number average molecular weight, both measured by gel permeation chromatography in trichlorobenzene at 135° C.) from 1.5 to 5, more preferably from 1.5 to 3.5.

Suitable propylene copolymers 2) are the plastomers Vistamaxx® and Versify® made available on the market by ExxonMobil Chemical and Dow Chemical, and the Notio® polymers, made available on the market by Mitsui Petrochemical.

The said copolymers 1) and 2) are typically produced by polymerization in the presence of metallocene catalysts.

As previously said, the compositions of the present invention have low seal initiation temperatures (preferably lower than 100° C., in particular equal to or lower than 95° C.) and high values of hot tack strength.

The compositions of the present invention are obtainable by melting and mixing the components, and the mixing is effected in a mixing apparatus at temperatures generally of from 180 to 310° C., preferably from 190 to 280° C., more preferably from 200 to 250° C.

Any known apparatus and technology can be used for this purpose.

Useful melt-mixing apparatus in this context are in particular extruders or kneaders, and particular preference is given to twin-screw extruders. It is also possible to premix the components at room temperature in a mixing apparatus.

During the preparation of the compositions, besides the main components A) and B), it is possible to introduce additives commonly employed in the art, such as stabilizing agents (against heat, light, U.V.), plasticizers, antiacids, antistatic and water repellant agents, slip agents, antiblocking agents.

As previously said, the compositions of the present invention are particularly useful for the preparation of films.

Films are generally characterized by a thickness of less than 100 μm and can be mono- or multilayer.

In the case of multilayer films, at least one layer comprises the compositions of the present invention. Each layer that does not comprise the compositions of the present invention can be composed of other olefin polymers, such as polypropylene or polyethylene.

Generally speaking, the films of this invention can be prepared by known techniques, such as extrusion and calendering. Specific examples of films containing the compositions of the present invention are disclosed hereinafter in the test for determining the seal initiation temperature (S.I.T.) and the hot tack.

The particulars are given in the following examples, which are given to illustrate, without limiting, the present invention.

The following analytical methods are used to determine the properties reported in the description and in the examples.

Ethylene, butene-1 and octene-1 Content of the Polymers

Determined by I.R. spectroscopy.

Melt Flow Rate MFR

Determined according to ASTM D 1238, at 230° C., 2.16 kg load for propylene polymers, at 190° C., 2.16 kg load for ethylene polymers.

Flexural Modulus

Measured according to ISO 178.

Melting Temperature (Tm)-(ISO 11357-3)

Determined by differential scanning calorimetry (DSC). A sample weighting 6±1 mg, is heated to 200±1° C. at a rate of 20° C./min and kept at 200±1° C. for 2 minutes in nitrogen stream and it is thereafter cooled at a rate of 20° C./min to 40±2° C., thereby kept at this temperature for 2 min to crystallise the sample. Then, the sample is again heated at a temperature rise rate of 20° C./min up to 200° C.±1. The heating scan is recorded, a thermogram is obtained, and, from this, temperatures corresponding to peaks are read. The temperature corresponding to the most intense melting peak recorded during the second heating is taken as the melting temperature.

Xylene Soluble Fraction

Determined as follows.

2.5 g of polymer and 250 cm$^3$ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 cm$^3$ of the filtered liquid is poured in a previously weighed aluminum container which is heated on a heating plate under nitrogen flow, to remove the solvent by evaporation. The container is then kept in an oven at 80° C. under vacuum until constant weight is obtained.

Determination of the Hot Tack Strength and of the Seal Strength (S.I.T.)

For the hot tack strength measurements, the following two methods are used.

Method 1

The film to be tested is first formed into a tube 76 mm (3 inches) long by 76 mm (3 inches) flat, wherein the test composition is in the inside layer.

The test is carried out according to the test method described in the experimental section of U.S. Pat. No. 4,725,505. Namely, the open end of the film tube is inserted into a Sentinel heat sealer. The seals are made at increasing temperatures under the following conditions:

sealing pressure of 0.14 MPa (20 psi);
dwell time of 2 seconds.

While the tube is being sealed, air is introduced in the tube. After the heat sealing is completed, the sample is removed from the heat sealer and then inspected. The hot tack strength is given by the maximum pressure, in inches of water, at which the seal under testing does not peel or creep more than 0.32 cm (⅛ inch).

Method 2

For each test film specimens 1.5 cm wide are superimposed in alignment, the adjacent layers being layers of the particular test composition.

The seals are made at increasing temperatures with a Sentinel heat sealer at one end of the said superimposed specimens along the 1.5 cm side and the hot tack strength is measured by attaching the unsealed ends to an Instron machine.

The sealing and testing conditions are:

sealing pressure of 0.28 Mpa (40 psi);
dwell time of 0.5 seconds;
cool time of 0.5 seconds;
peel speed of 150 mm/second.

The test is carried out immediately after sealing. The hot tack strength is given by the load required to separate the sealed specimens.

For the seal strength measurements, the superimposed specimens are sealed along one of the 1.5 cm sides with a Sentinel sealer. Sealing time is 0.5 seconds at a pressure of 0.28 MPa (40 psi). The sealing temperature is increased for each seal, starting from a sufficiently low temperature to make it possible to detect the S.I.T. The sealed samples are left to cool and aged for at least 1 day and then their unsealed ends are attached to an Instron machine where they are tested at a traction speed of 30.5 cm/min. (12 in/min.).

The S.I.T. is the minimum sealing temperature at which the seal does not break when a load of at least 2 Newtons is applied in the said test conditions.

Haze on Film

The measurement is carried out on a 50×50 mm portion cut from the central zone of the film.

The instrument used for the test is a Gardner photometer with Haze-meter UX-10 equipped with a G.E. 1209 lamp and filter C. The instrument calibration is made by carrying out a measurement in the absence of the sample (0% Haze) and a measurement with intercepted light beam (100% Haze).

Gloss on Film

Determined on the same specimens as for the Haze.

The instrument used for the test is a model 1020 Zehntner photometer for incident measurements. The calibration is made by carrying out a measurement at incidence angle of 60° on black glass having a standard Gloss of 96.2% and a measurement at an incidence angle of 45° on black glass having a standard Gloss of 55.4%.

EXAMPLE 1 AND 2 AND COMPARISON EXAMPLE 1

The following materials are used as components A) and B).

Component A)

Propylene copolymer composition having a MFR of 5.5 g/10 min., prepared according to Example 6 of WO03/031514 and comprising, by weight:

$A^I$) 30%, of a copolymer of propylene with butene-1, containing 12% by weight of butene-1;

$A^{II}$) 70% of a copolymer of propylene with ethylene and butene-1, containing 1% by weight of ethylene and 16% by weight of butene-1.

The MFR of 5.5 g/10 min. is obtained by thermal treatment with peroxide of the as-polymerized composition, having starting MFR of about 1 g/10 min.

Component B)

Engage 8200 as previously described.

Film Preparation

Before preparing the films of Examples 1 and 2, the said components A) and B) are melt-blended in an extruder TR 14/24D USF B.V.O (MAC GI XIV), with screw diameter of 14 mm and screw length/diameter ratio of 24:1, under the following conditions:

extrusion temperature of 210-220° C.;

screw rotation speed of 60 rpm.

BOPP films are produced using a multi-step process. First monolayer films having a thickness of about 76 μm (3 mil) are extruded from each heat seal material and then compression molded together with a homopolymer film having a thickness of about 508 μm (20 mil), the propylene homopolymer having a content of fraction insoluble in xylene at room temperature of 96% and a MFR value of 2 g/10 min., to create a 2 layer composite sheet.

These composite sheets are then cut to size and oriented via batch wise process using a TM Longstretcher. The TM Longstretcher is a lab scale stretching device. Similar orientation conditions are used for each material. The extrusion, compression molding and stretching conditions are provided below.

Collin 1 inch extruder with casting unit—preparation of heat seal layer:

| | |
|---|---|
| Heat zone #1 | 180° C.; |
| Heat zone #2 | 200° C.; |
| Heat zone #3 | 220° C.; |
| Heat zone #4 | 220° C.; |
| Die zone #5 | 220° C.; |
| Screw speed | 50 rpm; |
| Cast roll speed | 4.5 m/min; |
| Cast roll temperature | 21.7° C. (71° F.); |
| Sample thickness | about 76 μm. |

PHI compression molder:

Superimposed films of said homopolymer and heat seal material placed between sheets of Mylar film then between two steel platens;

Platen sandwich placed in the PHI press at 204° C. (400° F.) for 2 minutes at 3 tons of pressure;

Platen sandwich removed from press and inserted into another press set at 21.7° C. (71° F.) for 2 minutes at 3 tons pressure;

Platens separated and sample removed.

TM Longstretcher:

Sample cut from compression molded sheet;

Sample loaded into TM Longstretcher at 160° C., allowed a 35 second preheat, and then stretched 6× by 6× at a rate of 7.62 cm/second (3 inches/second);

Sample removed from unit and allowed to cool.

The properties of the films so obtained are reported in Table 1, together with the relative proportions of components A) and B) for Examples 1 and 2. In comparison Example 1 the seal layer is made of 100% of component A).

TABLE 1

| EXAMPLES | 1 | 2 | Comparison 1 |
|---|---|---|---|
| A), weight % | 90 | 80 | 100% |
| B), weight % | 10 | 20 | — |
| HOT TACK STRENGTH | | | |
| At 99° C., inch water* | 35 | 32 | 26 |
| At 104° C., inch water | 35 | 33 | 27 |
| At 110° C., inch water | 33 | 30 | 25 |
| At 115° C., inch water | 27 | 25 | 18 |
| At 99° C., N** | 4.9 | 5.6 | 4.2 |
| At 104° C., N | 5.7 | 6.2 | 5 |
| At 110° C., N | 5.2 | 5.4 | 5.2 |
| At 115° C., N | 5.4 | 5.1 | 4.6 |
| SEAL STRENGTH | | | |
| At 100° C., N | 5.5 | 4.1 | 3.8 |
| At 110° C., N | 3.9 | 3.8 | 3.2 |
| S.I.T., ° C. | 93 | 90 | 95 |
| OTHER PROPERTIES | | | |
| Haze, % | 2.05 | 1.9 | 0.4 |
| Gloss, ‰ | 58 | 22 | 27 |

Note to the table:
*measured according to HOT TACK method 1;
**measured according to HOT TACK method 2.

The invention claimed is:

1. A polyolefin compositions comprising, all percentages being by weight:
   A) from 70 to 95% of a composition comprising (by weight):
      $A^I$) 15-80%, at least one copolymer of propylene selected from the group consisting of:
         ($A^I$1) propylene/ethylene copolymers containing 1-7% of ethylene;
         ($A^I$2) copolymers of propylene with from 2 to less than 14% of least one $C_4$-$C_8$ alpha-olefin; and
         ($A^I$3) copolymers of propylene with ethylene and at least one $C_4$-$C_8$ alpha-olefin, containing 0.5-4.5% of ethylene and 2-6% of $C_4$-$C_8$ alpha-olefins, provided that the total content of ethylene and $C_4$-$C_8$ alpha-olefins in ($A^I$3) is at most 6.5%;
      $A^{II}$) 20-85% of at least one copolymer of propylene selected from the group consisting of:
         ($A^{II}$1) copolymers of propylene with from 14% to 30% of at least one $C_4$-$C_8$ alpha-olefin; and
         ($A^{II}$2) copolymers of propylene with ethylene and at least one C4-C8 alpha-olefin, containing 0.5-5% of ethylene and 9-30% of $C_4$-$C_8$ alpha-olefins; and
   B) from 5 to 30% of an elastomeric or plastomeric polyolefin or polyolefin composition.

2. The polyolefin compositions of claim 1, wherein component A) comprises, all percentages being by weight:
   $A^I$) from 15% to 60% of a copolymer of propylene with more than 10% but less than 14% $C_4$-$C_8$ alpha-olefin(s); and
   $A^{II}$) from 40% to 85% of a copolymer of propylene with 14% to 30% of $C_4$-$C_8$ alpha-olefin(s), and optionally from 0.5% to 3% of ethylene;
   provided that the total content of $C_4$-$C_8$ alpha-olefin(s) in the propylene polymer composition be higher than 10%.

3. The polyolefin compositions of claim 1, wherein component A) has MFR values from 0.5 to 10 g/10 min.

4. The polyolefin compositions of claim 1, wherein component B) has at least one of the following properties:
   a Flexural modulus (ISO 178A) of at most 200 MPa;
   a Shore D hardness of at most 50 points;
   a Shore A hardness of at most 90 points; and
   an X-ray crystallinity from 0 to 40.

5. A mono-layer film or a multilayer film, wherein at least one layer comprises a polyolefin composition comprising, all percentages being by weight:
   A) from 70 to 95% of a composition comprising (by weight):
      $A^I$) 15-80%, at least one copolymer of propylene selected from the group consisting of:
         ($A^I$1) propylene/ethylene copolymers containing 1-7% of ethylene;
         ($A^I$2) copolymers of propylene with from 2 to less than 14% of least one $C_4$-$C_8$ alpha-olefin; and
         ($A^I$3) copolymers of propylene with ethylene and at least one $C_4$-$C_8$ alpha-olefin, containing 0.5-4.5% of ethylene and 2-6% of $C_4$-$C_8$ alpha-olefins, provided that the total content of ethylene and $C_4$-$C_8$ alpha-olefins in ($A^I$3) is at most 6.5%;
      $A^{II}$) 20-85% of at least one copolymer of propylene selected from the group consisting of:
         ($A^{II}$1) copolymers of propylene with from 14% to 30% of at least one $C_4$-$C_8$ alpha-olefin; and
         ($A^I$2) copolymers of propylene with ethylene and at least one C4-C8 alpha-olefin, containing 0.5-5% of ethylene and 9-30% of $C_4$-$C_8$ alpha-olefins; and
   B) from 5 to 30% of an elastomeric or plastomeric polyolefin or polyolefin composition.

6. The polyolefin compositions of claim 1 wherein component A) is present in an amount from 75 to 95% and component B) is present in an amount from 5 to 25%.

7. The polyolefin compositions of claim 6 wherein component A) is present in an amount from 78 to 95% and component B) is present in an amount from 5 to 22%.

8. The polyolefin compositions of claim 1 wherein component $A^I$) is present in an amount from 20 to 60% and component $A^{II}$) is present in an amount from 40 to 80%.

9. The polyolefin compositions of claim 8 wherein component $A^I$) is present in an amount from 20 to 50% and component $A^{II}$) is present in an amount from 50 to 80%.

10. The polyolefin compositions of claim 1 wherein in component ($A^{II}$1) the $C_4$-$C_8$ alpha-olefin is present in an amount from 14.5% to 25%.

11. The polyolefin compositions of claim 2 wherein component $A^I$) is present in an amount from 20 to 60% and component $A^{II}$) is present in an amount from 40 to 80%.

12. The polyolefin compositions of claim 11 wherein component $A^I$) is present in an amount from 20 to 50% and component $A^{II}$) is present in an amount from 50 to 80%.

13. The polyolefin compositions of claim 2 wherein component $A^I$) is butene.

14. The polyolefin compositions of claim 2 wherein component $A^I$) is present in an amount more than 11%.

15. The polyolefin compositions of claim 14 wherein component $A^I$) is present in an amount more than 13% to 13.5%.

16. The polyolefin compositions of claim 2 wherein component $A^{II}$) is present in an amount more than 14.5% to 25%.

17. The polyolefin compositions of claim 16 wherein component $A^{II}$) is present in an amount more than 14.5% to 22%.

18. The polyolefin compositions of claim 4 wherein the Flexural modulus is at most 170 MPa.

19. The polyolefin compositions of claim 18 wherein the Flexural modulus is at most 100 MPa.

20. The polyolefin compositions of claim 4 wherein the Shore D hardness is at most 45 points.

21. The polyolefin compositions of claim 20 wherein the Shore D hardness is at most 32 points.

22. The polyolefin compositions of claim 4 wherein the X-ray crystallinity is from 0 to 30%.

* * * * *